(12) United States Patent
Matsumoto

(10) Patent No.: US 8,490,430 B2
(45) Date of Patent: Jul. 23, 2013

(54) PROCESS FOR FUSING GLASS

(75) Inventor: Satoshi Matsumoto, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 384 days.

(21) Appl. No.: 12/989,244

(22) PCT Filed: Apr. 22, 2009

(86) PCT No.: PCT/JP2009/057982
§ 371 (c)(1),
(2), (4) Date: Jan. 7, 2011

(87) PCT Pub. No.: WO2009/131144
PCT Pub. Date: Oct. 29, 2009

(65) Prior Publication Data
US 2011/0113828 A1    May 19, 2011

(30) Foreign Application Priority Data

Apr. 25, 2008  (JP) ................... P2008-115580
Apr. 25, 2008  (JP) ................... P2008-115583

(51) Int. Cl.
*C03C 17/04*  (2006.01)
*C03C 8/24*   (2006.01)

(52) U.S. Cl.
USPC ............... 65/33.6; 65/33.5; 65/33.2

(58) Field of Classification Search
USPC ........... 65/33.1, 33.2, 33.4–33.6; 445/23–45
See application file for complete search history.

(56) References Cited

U.S. PATENT DOCUMENTS

| 7,371,143 | B2 * | 5/2008  | Becken et al. ............... 445/25 |
| 7,602,121 | B2 * | 10/2009 | Aitken et al. ............... 313/512 |
| 7,815,480 | B2 * | 10/2010 | Logunov et al. ............... 445/25 |
| 7,992,411 | B2 * | 8/2011  | Boek et al. ............... 65/33.6 |
| 8,021,205 | B2 * | 9/2011  | Lee et al. ............... 445/25 |
| 8,057,273 | B2 * | 11/2011 | Ito et al. ............... 445/25 |
| 8,147,632 | B2 * | 4/2012  | Banks et al. ............... 156/89.11 |
| 8,147,976 | B2 * | 4/2012  | Boek et al. ............... 428/432 |
| 8,287,995 | B2 * | 10/2012 | Shibuya et al. ............... 428/213 |
| 8,329,303 | B2 * | 12/2012 | Banks et al. ............... 428/432 |
| 2009/0064717 | A1 * | 3/2009 | Son et al. ............... 65/42 |
| 2009/0297861 | A1 * | 12/2009 | Banks et al. ............... 428/428 |

(Continued)

FOREIGN PATENT DOCUMENTS

| CN | 1738777 | 2/2006 |
| JP | 2-120259 | 5/1990 |

(Continued)

*Primary Examiner* — Jason L. Lazorcik
(74) *Attorney, Agent, or Firm* — Drinker Biddle & Reath LLP

(57) ABSTRACT

When fusing glass members 104, 105 together by irradiating a glass layer 203 with a laser beam L2 along a region R to be fused, a crystallized area 108 formed in the glass layer 203 is taken as an irradiation-initiating point and an irradiation-ending point. Since the crystallized area 108 exhibits a laser absorptance lower than that of the glass layer 203 here, the glass layer 203 is gradually heated when the laser beam L2 is moved along the region R to be fused from the irradiation-initiating point, while the glass layer 203 is gradually cooled when the laser beam L2 is moved along the region R to be fused to the irradiation-ending point. This can prevent residual stresses from occurring in a part including the irradiation-initiating point and irradiation-ending point of the laser beam L2.

6 Claims, 15 Drawing Sheets

U.S. PATENT DOCUMENTS

| | | | |
|---|---|---|---|
| 2009/0297862 A1* | 12/2009 | Boek et al. .................... | 428/428 |
| 2011/0256407 A1* | 10/2011 | Boek et al. .................... | 428/428 |
| 2012/0111059 A1* | 5/2012 | Watanabe et al. ................ | 65/43 |
| 2012/0156406 A1* | 6/2012 | Banks et al. .................. | 428/34.4 |
| 2012/0240631 A1* | 9/2012 | Matsumoto ...................... | 65/43 |
| 2013/0011598 A1* | 1/2013 | Kawanami et al. ............. | 428/76 |

FOREIGN PATENT DOCUMENTS

| | | |
|---|---|---|
| JP | 2004-182567 | 7/2004 |
| JP | 2005-213125 | 8/2005 |
| JP | 2006-524419 | 10/2006 |
| JP | 4612438 | 1/2011 |

* cited by examiner (a)

(b)

PROCESS FOR FUSING GLASS

TECHNICAL FIELD

The present invention relates to a glass fusing method for manufacturing a glass fusing structure by fusing first and second glass members together.

BACKGROUND ART

Known as a conventional glass fusing method in the above-mentioned technical field is one forming a glass frit layer containing a glass fit between first and second glass members along a ring-shaped region to be fused and then irradiating the glass fit layer with a laser beam along the region to be fused, thereby fusing the first and second glass members together (see, for example, Patent Literature 1).

CITATION LIST

Patent Literature

Patent Literature 1: Japanese Translated International Patent Application Laid-Open No. 2006-524419

SUMMARY OF INVENTION

Technical Problem

However, there are cases where glass fusing methods such as the one mentioned above fail to fuse the first and second glass members reliably together.

In view of such circumstances, it is an object of the present invention to provide a glass fusing method which can reliably fuse the first and second glass members together.

Solution to Problem

For achieving the above-mentioned object, the glass fusing method in accordance with one aspect of the present invention is a glass fusing method for manufacturing a glass fusing structure by fusing first and second glass members together, the method comprising the steps of forming a glass layer along a ring-shaped region to be fused between the first and second glass members, forming a crystallized area in the glass layer by irradiating a part of the glass layer with a first laser beam, and fusing the first and second glass members together by irradiating the glass layer with a second laser beam along the region to be fused while taking the crystallized area as an irradiation-initiating point and an irradiation-ending point.

In this glass fusing method, the first and second glass members are fused together by irradiating a glass layer along a region to be fused while taking a crystallized area formed in the glass layer as an irradiation-initiating point and an irradiation-ending point. Since the crystallized area exhibits a laser absorptance lower than that of the glass layer here, the glass layer is gradually heated when the second laser beam is moved along the region to be fused from the irradiation-initiating point, while the glass layer is gradually cooled when the second laser beam is moved along the region to be fused to the irradiation-ending point. In addition, the crystallized area exhibits a coefficient of linear expansion lower than that of the glass layer, so that the first and second glass members are firmly fused together at the irradiation-initiating point, whereby the first and second glass members fused together at the irradiation-initiating point are inhibited from peeling off from each other even when the irradiation point of the second laser beam approaches the irradiation-initiating point. Therefore, this glass fusing method can prevent residual stresses from occurring in a part including the irradiation-initiating point and irradiation-ending point of the second laser beam. Hence, the first and second glass members can reliably be fused together.

In the conventional glass fusing methods, the first and second glass members fused together at the irradiation-initiating point may peel off from each other because of the melting or expansion of the glass frit layer at the laser irradiation point as the irradiation point approaches the irradiation-initiating point when the irradiation point is moved along the ring-shaped region to be fused. Therefore, further moving the laser irradiation point beyond the irradiation-initiating point at a speed faster than the peeling speed can fuse the first and second glass members together again. In such a case, however, residual stresses may occur in parts including the irradiation-initiating point and irradiation-ending point, so that these parts may become a peeling start point in response to a shock or the like. By contrast, the glass fusing method in accordance with the present invention can prevent residual stresses from occurring in a part including the irradiation-initiating point and irradiation-ending point of the laser beam.

The glass fusing method in accordance with another aspect of the present invention is a glass fusing method for manufacturing a glass fusing structure by fusing first and second glass members together, the method comprising the steps of forming a glass layer along a ring-shaped region to be fused between the first and second glass members, forming a crystallized area in the glass layer by irradiating a corner of the glass layer with a first laser beam, and fusing the first and second glass members together by irradiating the glass layer with a second laser beam along the region to be fused.

In this glass fusing method, the first and second glass members are fused together by irradiating a glass layer having a corner formed with a crystallized area with the second laser beam along a region to be fused. Since the crystallized area exhibits a laser absorptance lower than that of the glass layer here, the glass layer is gradually heated when the second laser beam is moved along the region to be fused from the crystallized area, while the glass layer is gradually cooled when the second laser beam is moved along the region to be fused to the crystallized area. In addition, the crystallized area exhibits a coefficient of linear expansion lower than that of the glass layer, so that the first and second glass members are firmly fused together in the crystallized area, whereby the first and second glass members fused together in the crystallized area are inhibited from peeling off from each other even when the irradiation point of the second laser beam approaches the crystallized area. Therefore, this glass fusing method can keep the corner of the glass layer from falling into an excessive heat input state which may damage the first and second glass members.

The conventional glass fusing methods may bring corners of the glass frit layer into an excessive heat input state when moving the laser irradiation point along the ring-shaped region to be fused, thereby damaging the first and second glass members. By contrast, the glass fusing method in accordance with the present invention can avoid causing an excessive heat input state which may damage the first and second glass members.

Preferably, in the glass fusing method in accordance with the present invention, the crystallized area is formed such that the absorptance for the second laser beam gradually decreases toward a center part thereof. In this case, the glass layer can be heated more gently when the second laser beam is moved along the region to be fused from the crystallized area, and can be cooled more gently when the second laser beam is moved along the region to be fused to the crystallized area.

Preferably, in the glass fusing method in accordance with the present invention, the first laser beam is pulse-oscillated, while the second laser beam is oscillated continuously. This can reliably form the crystallized area in a part of the glass layer while keeping it from falling into an excessive heat input state which may damage the first and second glass members, and can reliably fuse the first and second glass members together.

Advantageous Effects of Invention

The present invention can reliably fuse the first and second glass members together.

DESCRIPTION OF EMBODIMENTS

Figure 1:
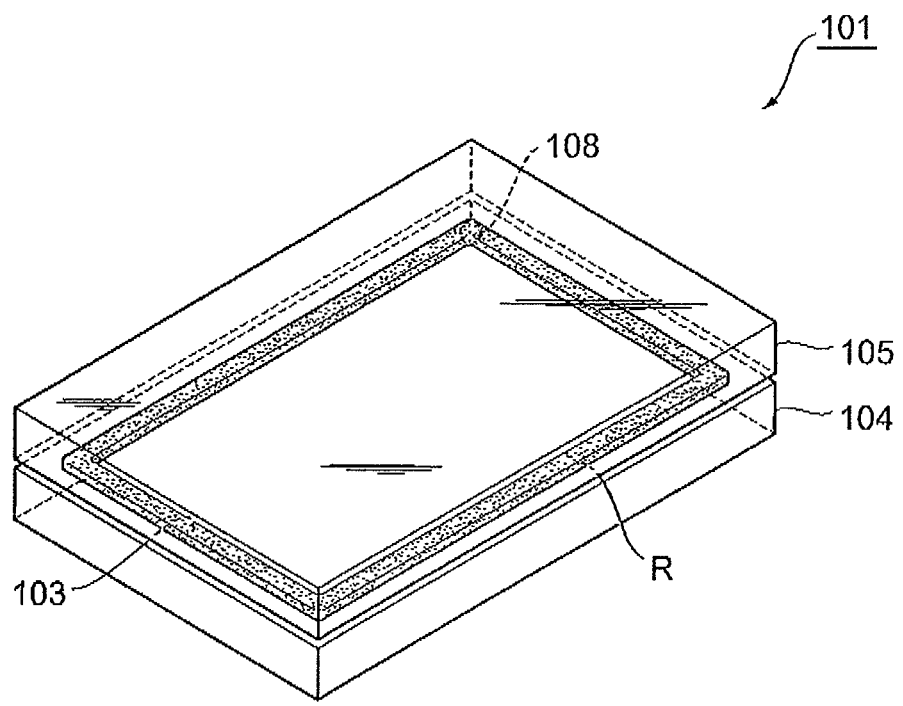
[FIG. 1] is a perspective view of a glass fusing structure manufactured by a first embodiment of the glass fusing method in accordance with the present invention.

In the following, preferred embodiments of the present invention will be explained in detail with reference to the drawings. In the drawings, the same or equivalent parts will be referred to with the same signs while omitting their overlapping descriptions.

First Embodiment

FIG. 1 is a perspective view of a glass fusing structure manufactured by the first embodiment of the glass fusing method in accordance with the present invention. As illustrated in FIG. 1, this glass fusing structure 101 is a fusion-bonded glass structure in which a glass member (first glass member) 104 and a glass member (second glass member) 105 are fused together through a glass layer 103 formed along a region R to be fused. Each of the glass members 104, 105 is a member formed into a rectangular plate having a thickness of 0.7 mm made of alkali-free glass, for example, while the region R to be fused is set as a rectangular ring along the outer edges of the glass members 104, 105. The glass layer 103 is made of amorphous low-melting glass (vanadium-phosphate-based glass, lead borosilicate glass, or the like), for example, and formed into a rectangular ring along the region R to be fused. One of corners of the glass layer 103 is formed with a crystallized area 108 in which a part of the glass layer 103 is crystallized.

The glass fusing method for manufacturing the above-mentioned glass fusing structure 101 will now be explained.

Figure 2:
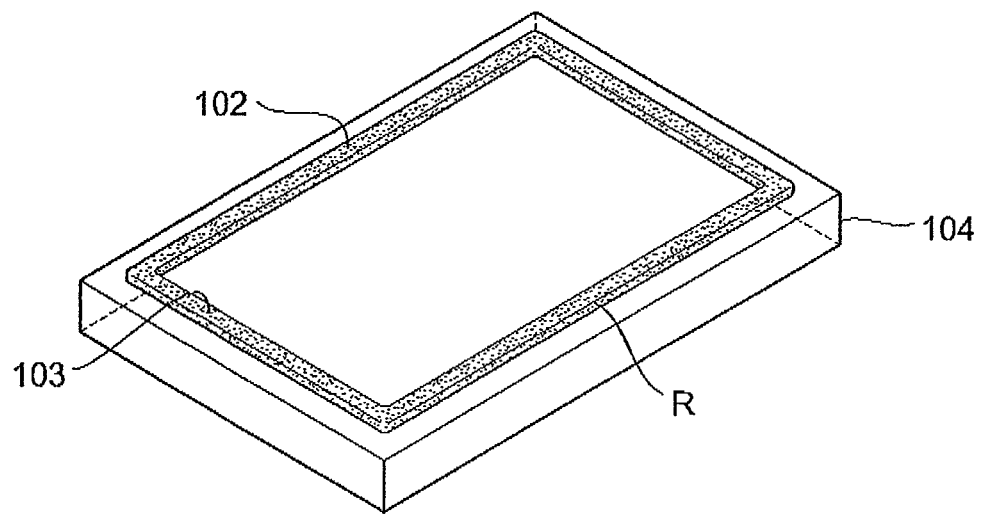
[FIG. 2] is a perspective view for explaining the glass fusing method for manufacturing the glass fusing structure of FIG. 1.

First, as illustrated in FIG. 2, a powdery glass frit 102 made of low-melting glass (vanadium-phosphate-based glass, lead borosilicate glass, or the like), for example, is firmly attached to a surface of the glass member 104, so as to form the glass layer 103 along the rectangular-ring-shaped region R to be fused, Specifically, a frit paste (formed by kneading the glass frit 102, an organic solvent, and a binder) is applied by a dispenser, screen printing, or the like to the surface of the glass member 104 along the region R. to be fused, and then the glass member 104 coated with the frit paste is dried in a dryer, so as to remove the organic solvent, Subsequently, the glass member 104 is dried in a heating furnace, so as to remove the binder, and then fired (temporarily fired) at a higher temperature, so that the glass fit 102 is molten and resolidified, whereby the glass layer 103 is formed on the glass member 104.

Figure 6:
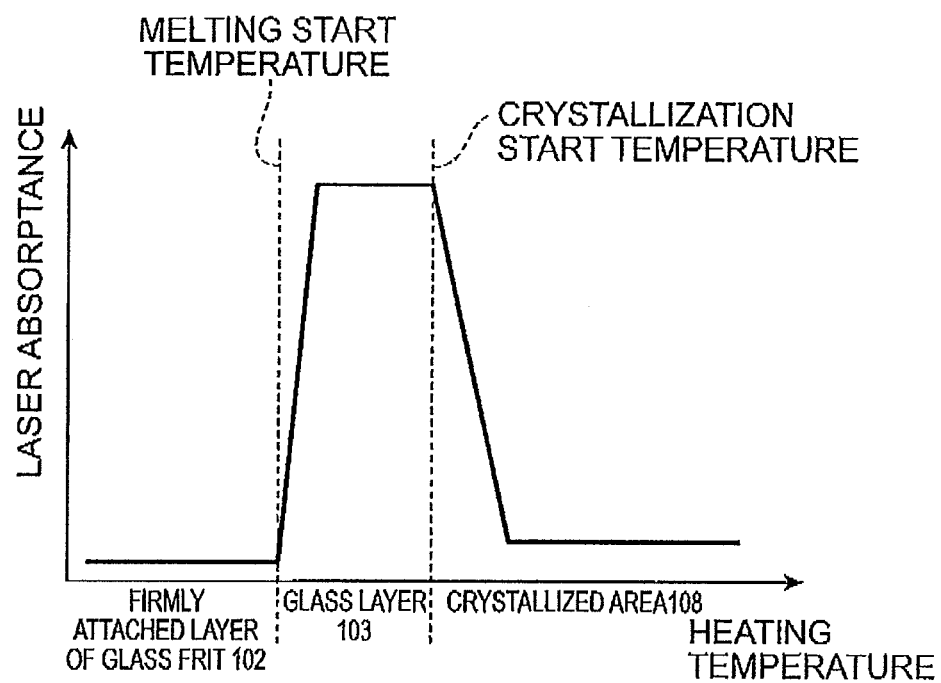
[FIG. 6] is a graph illustrating a relationship between the glass heating temperature and the laser absorptance.

As illustrated in FIG. 6, the firmly attached layer of the glass frit 102 exhibits low laser absorptance (appears white in visible light), since the powdery glass fit 102 causes scattering of light greater than the absorption characteristic of laser-absorbing pigments. By contrast, the glass layer 103 drastically raises the laser absorptance (appears black in visible light), since voids are filled by melting and resolidification and become transparent so that the laser-absorbing pigments exhibit their absorption characteristic remarkably.

Figure 3:
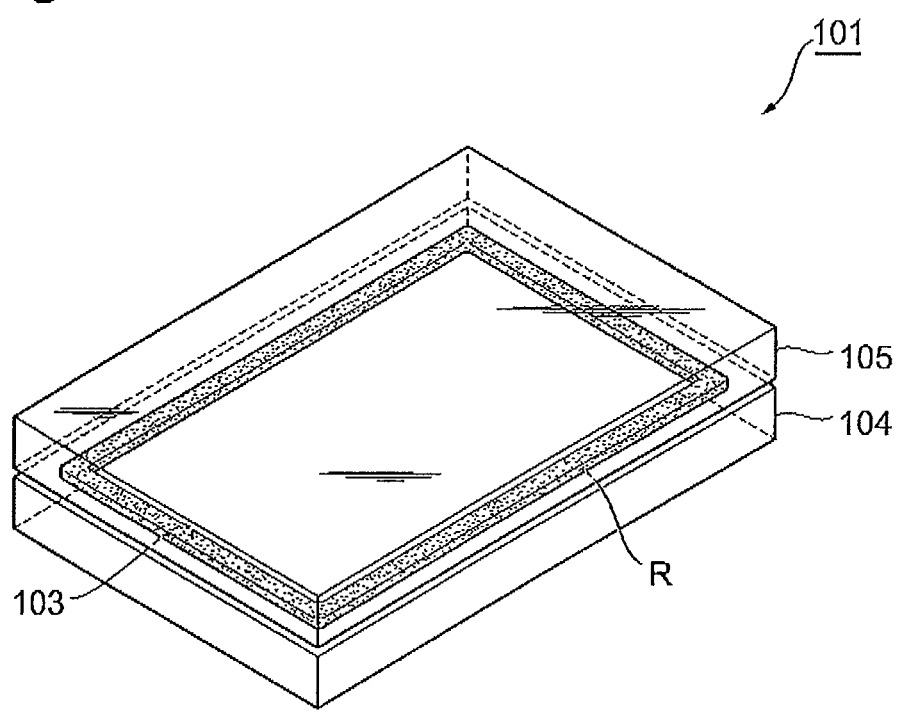
[FIG. 3] is a perspective view for explaining the glass fusing method for manufacturing the glass fusing structure of FIG. 1.

Next, as illustrated in FIG. 3, the glass member 105 is placed on the glass member 104 with the glass layer 103 interposed therebetween, and the glass members 104, 105 are secured such that the glass member 105 is pressed against the glass member 104. This forms the glass layer 103 along the rectangular-ring-shaped region R to be fused between the glass members 104, 105.

Figure 4:
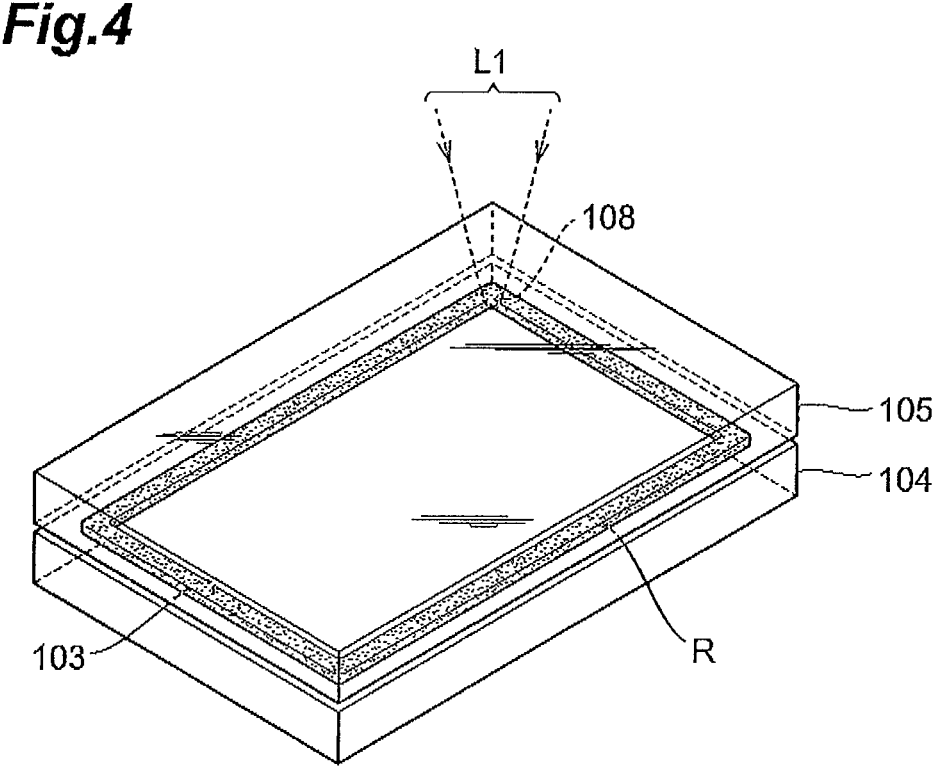
[FIG. 4] is a perspective view for explaining the glass fusing method for manufacturing the glass fusing structure of FIG. 1.

Subsequently, as illustrated in FIG. 4, one corner of the glass layer 103 is irradiated with a laser beam (first laser beam) Li while locating a converging spot at the glass layer 103, so as to form the crystallized area 108 at the one corner of the glass layer 103. The laser beam LI is pulse-oscillated from a semiconductor laser having an oscillation wavelength of 940 nm and irradiates the one corner of the glass layer 103 under the condition with a spot diameter of 1.6 mm, a laser power of 40 W, and an irradiation time of 300 msec. This allows the glass layer 103 having high laser absorptance to absorb the laser beam L1, thereby forming the spherical crystallized area 108 whose laser absorptance gradually decreases toward its center part.

As illustrated in FIG. 6, the crystallized area 108 decreases the laser absorptance (appears white in visible light), since scattering of light greater than the absorption characteristic of laser-absorbing pigments occurs at interfaces between crystalline substances and interfaces between crystalline and amorphous substances. In the crystallized area 108, the laser absorptance gradually decreases toward the center part (whiteness appears to increase toward the center part in visible light).

Figure 5:
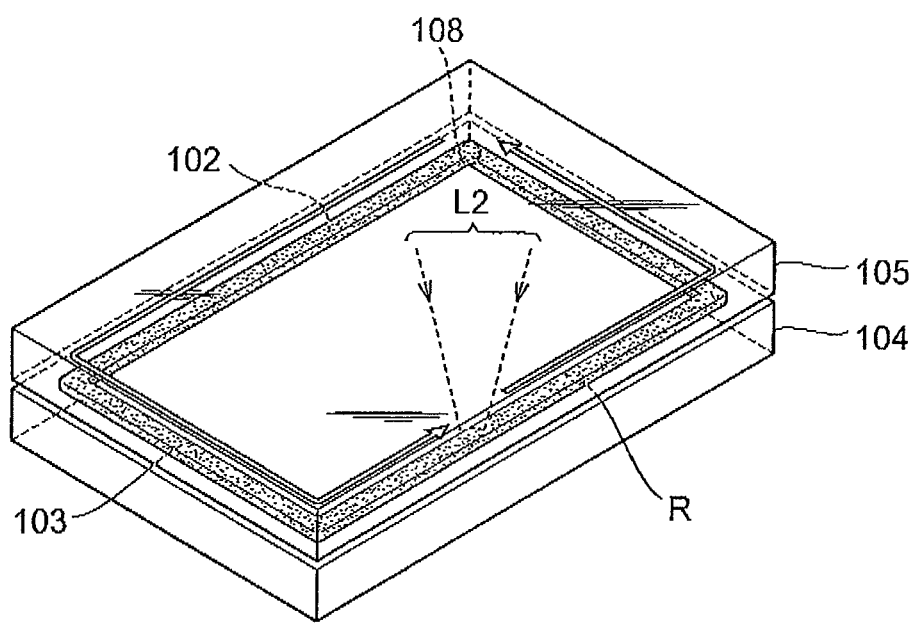
[FIG. 5] is a perspective view for explaining the glass fusing method for manufacturing the glass fusing structure of FIG. 1.

Next, as illustrated in FIG. 5, the glass layer 103 is irradiated with a laser beam (second laser beam) L2 along the region R to be fused while locating a converging spot at the glass layer 103 and using the crystallized area 108 as an irradiation-initiating point and an irradiation-ending point, so as to fuse the glass members 104, 105 together, thereby yielding the glass fusing structure 101. The laser beam L2 is continuously oscillated from a semiconductor laser having an oscillation wavelength of 940 nm and irradiates the glass layer 103 under the condition with a spot diameter of 1.6 mm, a laser power of 40 W, and a scan speed (relative moving speed of the converging spot of the laser beam L2 along the region R to be fused) of 10 mm/sec. This allows the glass layer 103 having high laser absorptance to absorb the laser beam L2, so that the glass layer 103 and its surrounding parts (surface parts of the glass members 104, 105) melt and resolidify, thereby bonding the glass members 104, 105 together.

When fusing the glass members 104, 105 together by irradiating the glass layer 103 with the laser beam L2 along the region R to be fused, the foregoing glass fusing method uses the crystallized area 108 formed in the glass layer 103 as the irradiation-initiating point and irradiation-ending point.

Since the crystallized area 108 exhibits a laser absorptance lower than that of the glass layer 103 here (see FIG. 6), the glass layer 103 is gradually heated when the converging spot of the laser beam L2 is moved along the region R to be fused from the irradiation-initiating point, while the glass layer 103 is gradually cooled when the converging spot of the laser beam L2 is moved along the region R to be fused to the irradiation-ending point. Since the crystallized area 108 is formed such that the laser absorptance gradually decreases toward the center part here, the glass layer 108 can be heated more gently when the converging spot of the laser beam L2 is moved along the region R to be fused from the irradiation-initiating point. The same holds true for the cooling of the glass layer 103 when the converging spot of the laser beam L2 is moved along the region R to be fused to the irradiation-ending point.

In addition, the crystallized area 108 exhibits a coefficient of linear expansion lower than that of the glass layer 103, so that the glass members 104, 105 are firmly fused together at the irradiation-initiating point. Therefore, the glass members 104, 105 fused together at the irradiation-initiating point are inhibited from peeling off from each other even when the irradiation point of the laser beam L2, which is a position where the glass layer 103 melts and expands, approaches the irradiation-initiating point.

Hence, the above-mentioned glass fusing method can prevent residual stresses from occurring in a part including the irradiation-initiating point and irradiation-ending point of the laser beam L2. Here, forming the crystallized area 108 continuously along the region R to be fused may damage the glass members 104, 105, since the crystallized area 108 shrinks drastically during its formation.

Since the laser beam L1 for forming the crystallized area 108 is pulse-oscillated while the laser beam L2 for fusing the glass members 104, 105 together is oscillated continuously, the crystallized area 108 can reliably be formed in a part of the glass layer 103 while being kept from falling into an excessive heat input state which may damage the glass members 104, 105, and the glass members 104, 105 can reliably be fused together.

The present invention is not limited to the above-mentioned first embodiment.

For example, the position where the crystallized area 108 is formed (i.e., the irradiation-initiating point and irradiation-ending point of the laser beam L2) may be a linear part of the region R to be fused without being restricted to a corner of the region R to be fused. The region R to be fused may be shaped into a circular ring or the like without being restricted to the rectangular ring as long as it has a ring form.

The glass frit 102 may be disposed between the glass members 104, 105 instead of being firmly attached to the glass member 104, so as to form the glass layer 103 along the region R to be fused.

Second Embodiment

Figure 7:
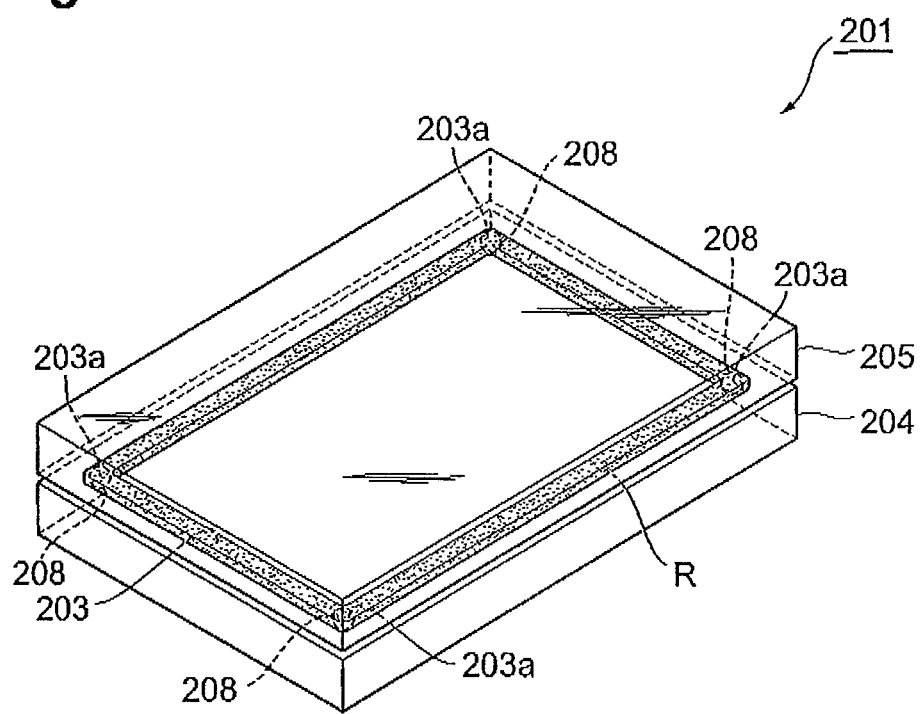
[FIG. 7] is a perspective view of a glass fusing structure manufactured by a second embodiment of the glass fusing method in accordance with the present invention.

FIG. 7 is a perspective view of a glass fusing structure manufactured by the second embodiment of the glass fusing method in accordance with the present invention. As illustrated in FIG. 7, this glass fusing structure 201 is a fusion-bonded glass structure in which a glass member (first glass member) 204 and a glass member (second glass member) 205 are fused together through a glass layer 203 formed along a region R to be fused. Each of the glass members 204, 205 is a member formed into a rectangular plate having a thickness of 0.7 mm made of alkali-free glass, for example, while the region R to be fused is set as a rectangular ring along the outer edges of the glass members 204, 205. The glass layer 203 is made of amorphous low-melting glass (vanadium-phosphate-based glass, lead borosilicate glass, or the like), for example, and formed into a rectangular ring along the region R to be fused. Each of four corners 203a of the glass layer 203 is formed with a crystallized area 208 in which a part of the glass layer 203 is crystallized.

The glass fusing method for manufacturing the above-mentioned glass fusing structure 201 will now be explained.

Figure 8:
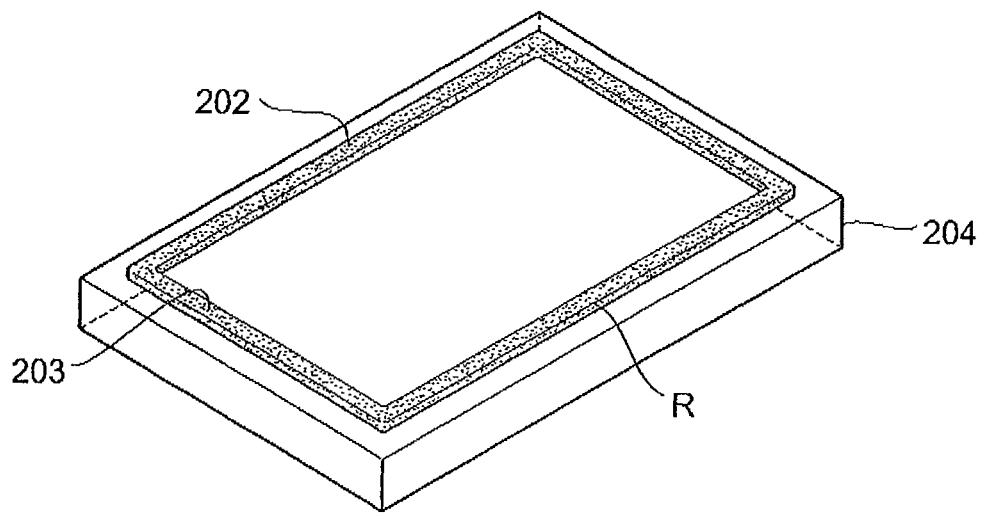
[FIG. 8] is a perspective view for explaining the glass fusing method for manufacturing the glass fusing structure of FIG. 7.

First, as illustrated in FIG. 8, a powdery glass frit 202 made of low-melting glass (vanadium-phosphate-based glass, lead borosilicate glass, or the like), for example, is firmly attached to a surface of the glass member 204, so as to form the glass layer 203 along the rectangular-ring-shaped region R to be fused. Specifically, a frit paste (formed by kneading the glass frit 202, an organic solvent, and a binder) is applied by a dispenser, screen printing, or the like to the surface of the glass member 204 along the region R to be fused, and then the glass member 204 coated with the fit paste is dried in a dryer, so as to remove the organic solvent. Subsequently, the glass member 204 is dried in a heating furnace, so as to remove the binder, and then fired (temporarily fired) at a higher temperature, so that the glass frit 202 is molten and resolidified, whereby the glass layer 203 is formed on the glass member 204.

Figure 12:
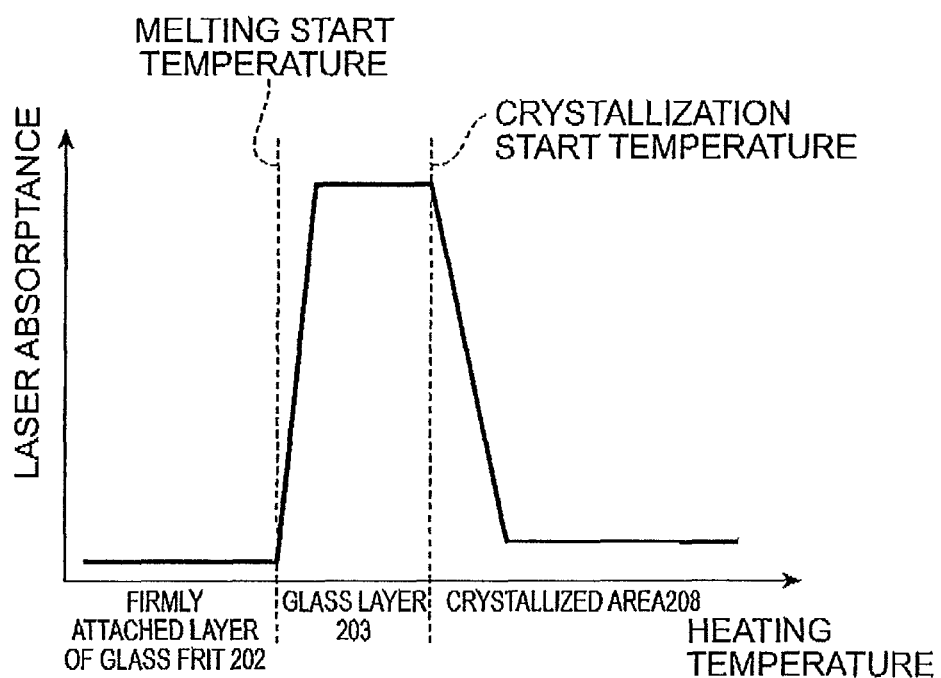
[FIG. 12] is a graph illustrating a relationship between the glass heating temperature and the laser absorptance.

As illustrated in FIG. 12, the firmly attached layer of the glass frit 202 exhibits low laser absorptance (appears white in visible light), since the powdery glass frit 202 causes scattering of light greater than the absorption characteristic of laser-absorbing pigments. By contrast, the glass layer 203 drastically raises the laser absorptance (appears black in visible light), since voids are filled by melting and resolidification and become transparent so that the laser-absorbing pigments exhibit their absorption characteristic remarkably.

Figure 9:
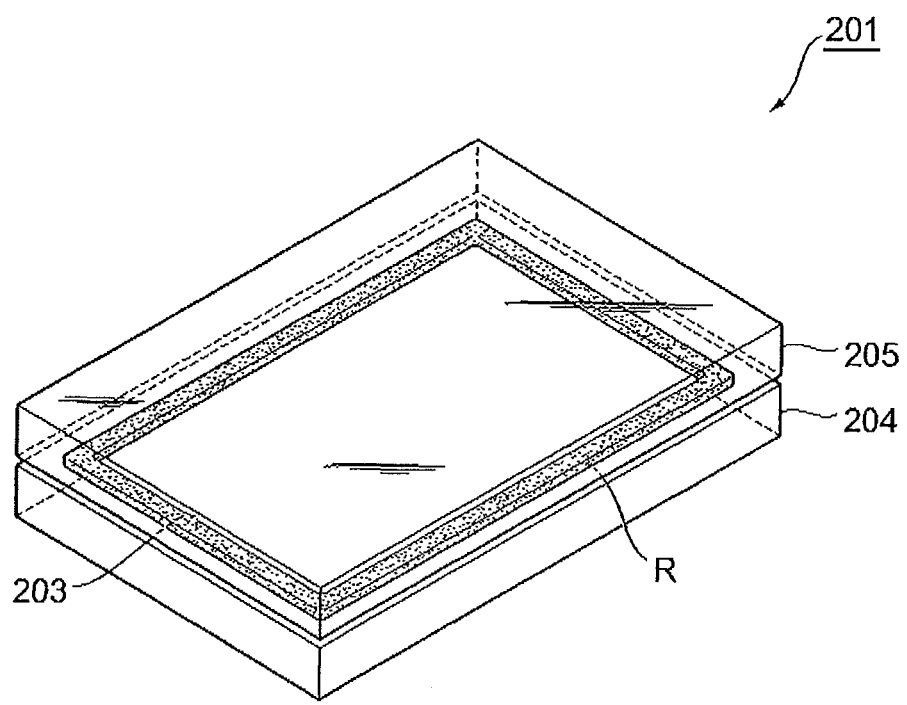
[FIG. 9] is a perspective view for explaining the glass fusing method for manufacturing the glass fusing structure of FIG. 7.

Next, as illustrated in FIG. 9, the glass member 205 is placed on the glass member 204 with the glass layer 203 interposed therebetween, and the glass members 204, 205 are secured such that the glass member 205 is pressed against the glass member 204. This forms the glass layer 203 along the rectangular-ring-shaped region R to be fused between the glass members 204, 205.

Figure 10:
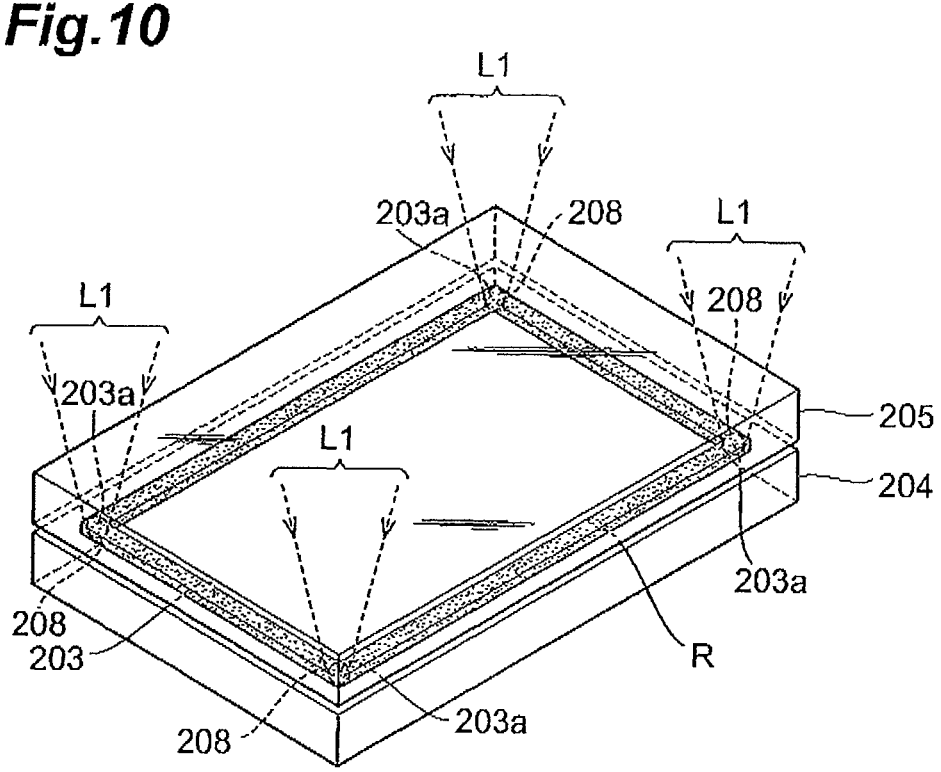
[FIG. 10] is a perspective view for explaining the glass fusing method for manufacturing the glass fusing structure of FIG. 7.

Subsequently, as illustrated in FIG. 10, each corner 203a of the glass layer 203 is irradiated with a laser beam (first laser beam) L1 while locating a converging spot at the glass layer 203, so as to form the crystallized area 208 at each corner 203a of the glass layer 203. The laser beam L1 is pulse-oscillated from a semiconductor laser having an oscillation wavelength of 940 nm and irradiates the one corner of the glass layer under the condition with a spot diameter of 1.6 mm, a laser power of 40 W, and an irradiation time of 300 msec. This allows the glass layer 203 having high laser absorptance to absorb the laser beam L1, thereby forming the spherical crystallized area 208 whose laser absorptance gradually decreases toward its center part.

As illustrated in FIG. 12, the crystallized area 208 decreases the laser absorptance (appears white in visible light), since scattering of light greater than the absorption characteristic of laser-absorbing pigments occurs at interfaces between crystalline substances and interfaces between crystalline and amorphous substances. In the crystallized area 208, the laser absorptance gradually decreases toward the center part (whiteness appears to increase toward the center part in visible light).

Figure 11:
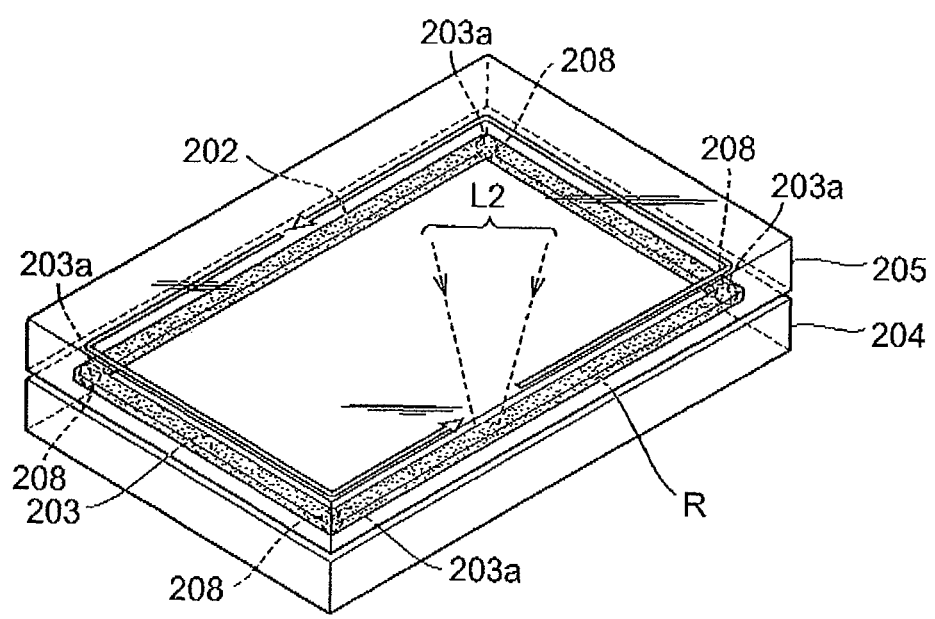
[FIG. 11] is a perspective view for explaining the glass fusing method for manufacturing the glass fusing structure of FIG. 7.

Next, as illustrated in FIG. 11, the glass layer 203 is irradiated with a laser beam (second laser beam) L2 along the region R to be fused while locating a converging spot at the glass layer 203 and using one crystallized area 208 as an irradiation-initiating point and an irradiation-ending point, so as to fuse the glass members 204, 205 together, thereby yielding the glass fusing structure 201. The laser beam L2 is continuously oscillated from a semiconductor laser having an oscillation wavelength of 940 nm and irradiates the glass layer 203 under the condition with a spot diameter of 1.6 mm, a laser power of 40 W, and a scan speed (relative moving speed of the converging spot of the laser beam L2 along the region R to be fused) of 10 mm/sec. This allows the glass layer 203 having high laser absorptance to absorb the laser beam L2, so that the glass layer 203 and its surrounding parts (surface parts of the glass members 204, 205) melt and resolidify, thereby bonding the glass members 204, 205 together.

The foregoing glass fusing method forms the crystallized area 208 at each corner 203a of the glass layer 203 before fusing the glass members 204, 205 together by irradiating the glass layer 203 with the laser beam L2 along the region R to be fused.

Since the crystallized area 208 exhibits a laser absorptance lower than that of the glass layer 203 here (see FIG. 12), the glass layer 203 is gradually heated when the converging spot of the laser beam L2 is moved along the region R to be fused from the crystallized area 208, while the glass layer 203 is gradually cooled when the converging spot of the laser beam L2 is moved along the region R to be fused to the crystallized area 208. Since the crystallized area 208 is formed such that the laser absorptance gradually decreases toward the center part here, the glass layer 203 can be heated more gently when the converging spot of the laser beam L2 is moved along the region R to be fused from the crystallized area 208. The same holds true for the cooling of the glass layer 203 when the converging spot of the laser beam L2 is moved along the region R to be fused to the crystallized area 208.

In addition, the crystallized areas 208 exhibit a coefficient of linear expansion lower than that of the glass layer 203, so that the glass members 204, 205 are firmly fused together at each crystallized area 208. Therefore, the glass members 204, 205 fused together at the crystallized areas 208 are inhibited from peeling off from each other even when the irradiation point of the laser beam L2, which is a position where the glass layer 203 melts and expands, approaches the crystallized areas 208.

Hence, the above-mentioned glass fusing method can prevent each corner 203a of the glass layer 203 from falling into an excessive heat input state which may damage the glass members 204, 205. Here, forming the crystallized area 208 continuously along the region R to be fused may damage the glass members 204, 205, since the crystallized area 208 shrinks drastically during its formation.

Since the laser beam L1 for forming the crystallized areas 208 is pulse-oscillated while the laser beam L2 for fusing the glass members 204, 205 together is oscillated continuously, the crystallized area 208 can reliably be formed at each corner 203a of the glass layer 203 while being kept from falling into an excessive heat input state which may damage the glass members 204, 205, and the glass members 204, 205 can reliably be fused together.

Since the glass members 204, 205 are firmly fused together through the crystallized areas 208 at the corners 203a of the glass layer 203 in the glass fusing structure 201, the glass members 204, 205 can reliably be prevented from peeling off from each other at the corners 203a where stresses are likely to concentrate.

Figure 13:
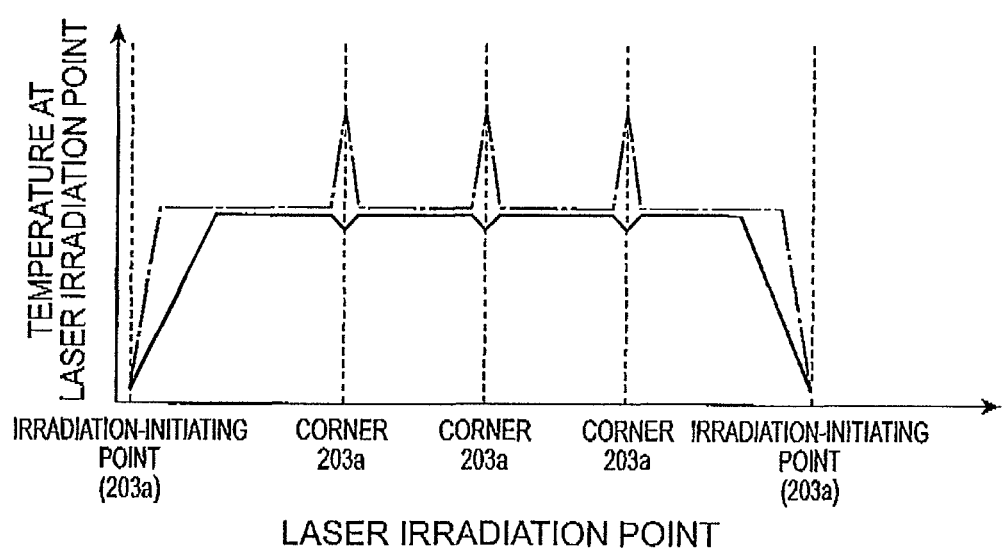
[FIG. 13] is a graph illustrating a relationship between the laser irradiation point and the temperature at the laser irradiation point during laser irradiation from the irradiation-initiating point to the irradiation-ending point.

FIG. 13 is a graph illustrating a relationship between the laser irradiation point and the temperature at the laser irradiation point during laser irradiation from the irradiation-initiating point to the irradiation-ending point. Here, the result represented by a dash-single-dot line is one obtained by the conventional glass fusing method, while the result represented by a solid line is one obtained by the above-mentioned glass fusing method.

In the conventional glass fusing method, as illustrated in FIG. 13, the temperature rises at each corner 203a of the glass layer 203 during irradiation with the laser beam L2, since no crystallized areas 208 exhibiting low laser absorptance are formed at the corners 203a while the scan speed of the laser beam L2 drops at each corner 203a. Therefore, each corner 203a may fall into an excessive heat input state, thereby damaging the glass members 204, 205. Since no crystallized areas 208 exhibiting low laser absorptance are formed at the corner 203a of the glass layer 203 acting as the irradiation-initiating point and irradiation-ending point of the laser beam L2, the temperature of the glass layer 203 rises drastically when the converging spot of the laser beam L2 is moved along the region R to be fused from the irradiation-initiating point, while the temperature of the glass layer 203 drops drastically when the converging spot of the laser beam L2 is moved along the region R to be fused to the irradiation-ending point. Hence, there is a fear of residual stresses occurring in a part including the irradiation-initiating point and irradiation-ending point of the laser beam L2.

In the above-mentioned glass fusing method, by contrast, the crystallized areas 208 exhibiting low laser absorption are formed at the corners 203a of the glass layer 203, so that the temperature is inhibited from rising at each corner 203a during irradiation with the laser beam L2 even if the scan speed of the laser beam L2 drops at each corner 203a. This can prevent each corner 203a from falling into an excessive heat input state and damaging the glass members 204, 205. Since the crystallized area 208 exhibiting low laser absorptance is formed at the corner 203a of the glass layer 203 acting as the irradiation-initiating point and irradiation-ending point of the laser beam L2, the temperature of the glass layer 203 gradually rises when the converging spot of the laser beam L2 is moved along the region R to be fused from the irradiation-initiating point, while the temperature of the glass layer 203 gradually drops when the converging spot of the laser beam L2 is moved along the region R to be fused to the irradiation-ending point. This can prevent residual stresses from occurring in a part including the irradiation-initiating point and irradiation-ending point of the laser beam L2.

The present invention is not limited to the above-mentioned second embodiment.

For example, the region R to be fused may be shaped into a circular ring or the like without being restricted to the rectangular ring as long as it has a ring form. The irradiation-initiating point and irradiation-ending point of the laser light L2 for fusing the glass members 204, 205 together are not limited to the crystallized areas 208, but may be located in a part free of the crystallized areas 208 in the glass layer 203. The irradiation-initiating point and irradiation-ending point of the laser light L2 may be positions different from each other.

Figure 14:
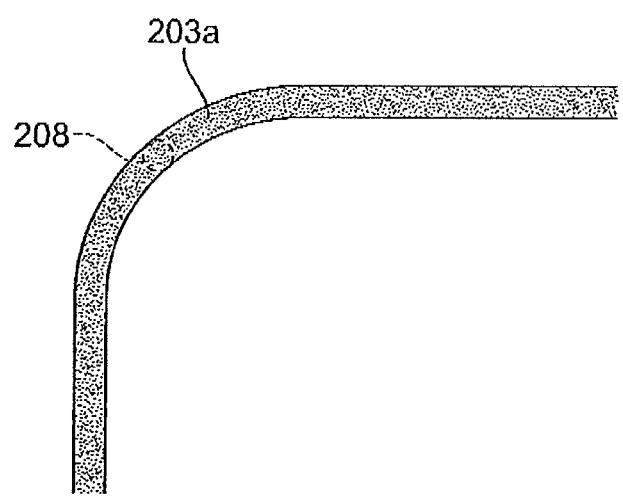
[FIG. 14] is a diagram for explaining a position at which a crystallized area is formed in the case where a corner of a glass layer is curved.
Figure 14:
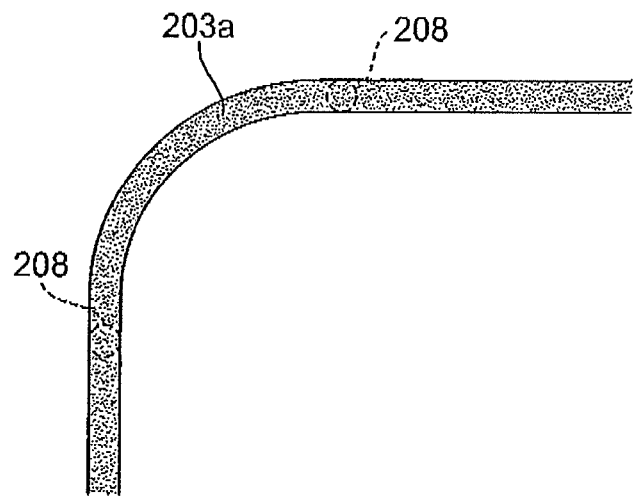

The corners 203a of the glass layer 203 are not limited to bent ones but may also be curved ones. When the corner 203a is a curved one, the crystallized area 208 may be formed at the center of the curved part as illustrated in FIG. 14(a), or the crystallized areas 208 may be formed at both ends of the curved part as illustrated in FIG. 14(b).

Figure 15:
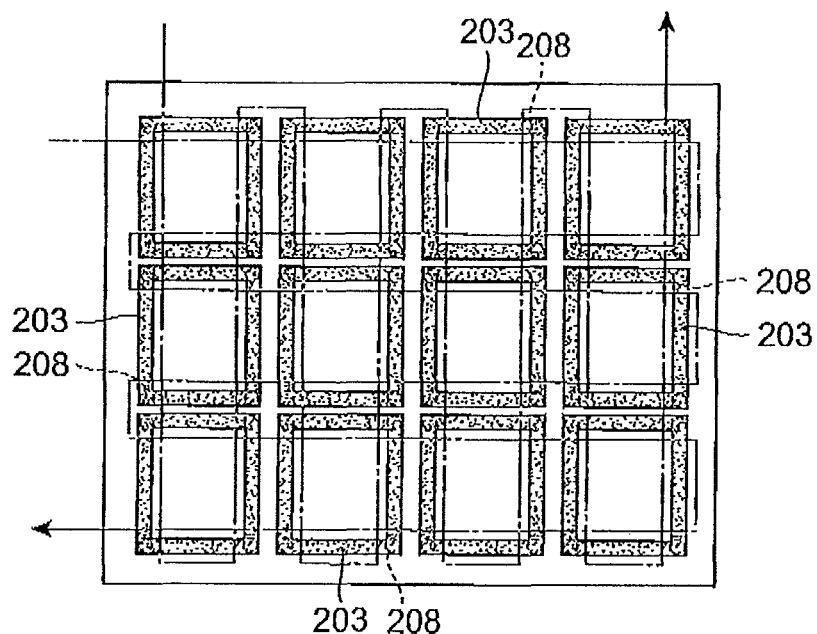
[FIG. 15] is a diagram for explaining a laser beam scanning method in the case where a plurality of regions to be fused are arranged in a matrix.
Figure 15:
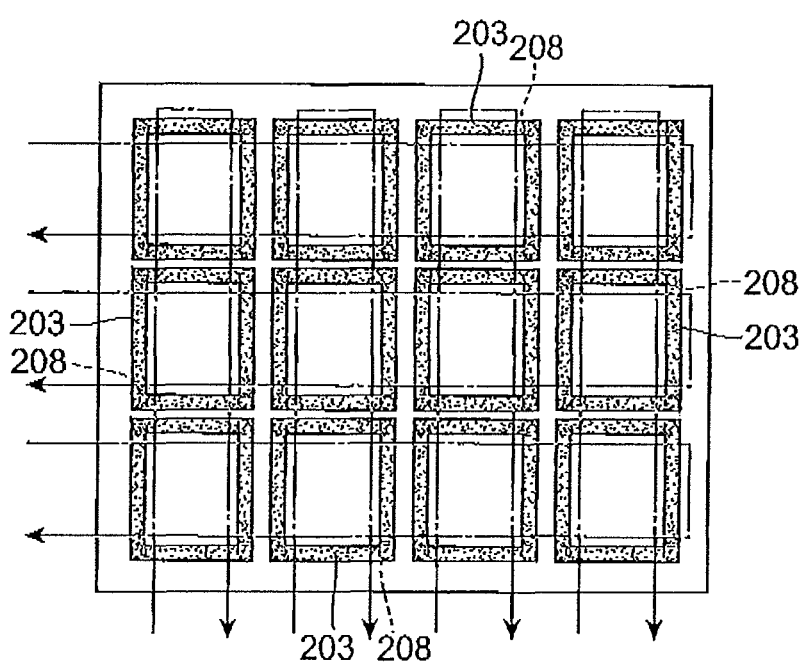

When irradiating the ring-shaped region R to be fused with the laser beam L2 for fusing the glass members 204, 205 together, the scanning with the laser beam L2 is not required to be unicursal. When a plurality of regions R to be fused are arranged in a matrix to be diced, for example, they may be scanned with a single laser beam L2 which travels back and forth a plurality of times as illustrated in FIG. 15(a) or with multiple laser beams L2 each of which travels back and forth one time as illustrated in FIG. 15(b).

The glass fit 202 may be disposed between the glass members 204, 205 instead of being firmly attached to the glass member 204, so as to form the glass layer 203 along the region R to be fused.

INDUSTRIAL APPLICABILITY

The present invention can reliably fuse the first and second glass members together.

REFERENCE SIGNS LIST 101, 201 . . . glass fusing structure; 103, 203 . . . glass layer; 203a . . . corner; 104, 204 . . . glass member (first glass member); 105, 205 . . . glass member (second glass member); 108, 208 . . . crystallized area; R . . . region to be fused; L1 . . . laser beam (first laser beam); L2 . . . laser beam (second laser beam)

The invention claimed is:

1. A glass fusing method for manufacturing a fused glass structure by fusing first and second glass members together, the method comprising the steps of:
    forming a glass layer along a ring-shaped region to be fused between the first and second glass members;
    forming a crystallized area in the glass layer by irradiating a part of the glass layer with a first laser beam; and
    fusing the first and second glass members together by irradiating the glass layer with a second laser beam around the ring-shaped region to be fused wherein the crystallized area is used as an irradiation-initiating point and an irradiation-ending point for the second laser beam during said fusing.

2. A glass fusing method for manufacturing a fused glass structure by fusing first and second glass members together, the method comprising the steps of:
    forming a glass layer along a ring-shaped region having a corner to be fused between the first and second glass members;
    forming a crystallized area in the glass layer by irradiating the corner of the glass layer with a first laser beam; and
    fusing the first and second glass members together by irradiating the glass layer with a second laser beam around the ring-shaped region to be fused.

3. A glass fusing method according to claim 1, wherein the crystallized area is formed such that the absorptance for the second laser beam gradually decreases toward a center part of said crystallized area.

4. A glass fusing method according to claim 1, wherein the first laser beam is pulse-oscillated, while the second laser beam is oscillated continuously.

5. A glass fusing method according to claim 2, wherein the crystallized area is formed such that the absorptance for the second laser beam gradually decreases toward a center part of said crystallized area.

6. A glass fusing method according to claim 2, wherein the first laser beam is pulse-oscillated, while the second laser beam is oscillated continuously.

* * * * *

UNITED STATES PATENT AND TRADEMARK OFFICE
CERTIFICATE OF CORRECTION

PATENT NO.       : 8,490,430 B2                                              Page 1 of 1
APPLICATION NO. : 12/989244
DATED            : July 23, 2013
INVENTOR(S)      : Satoshi Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 457 days.

Signed and Sealed this
Eighth Day of September, 2015

Michelle K. Lee
*Director of the United States Patent and Trademark Office*